UNITED STATES PATENT OFFICE.

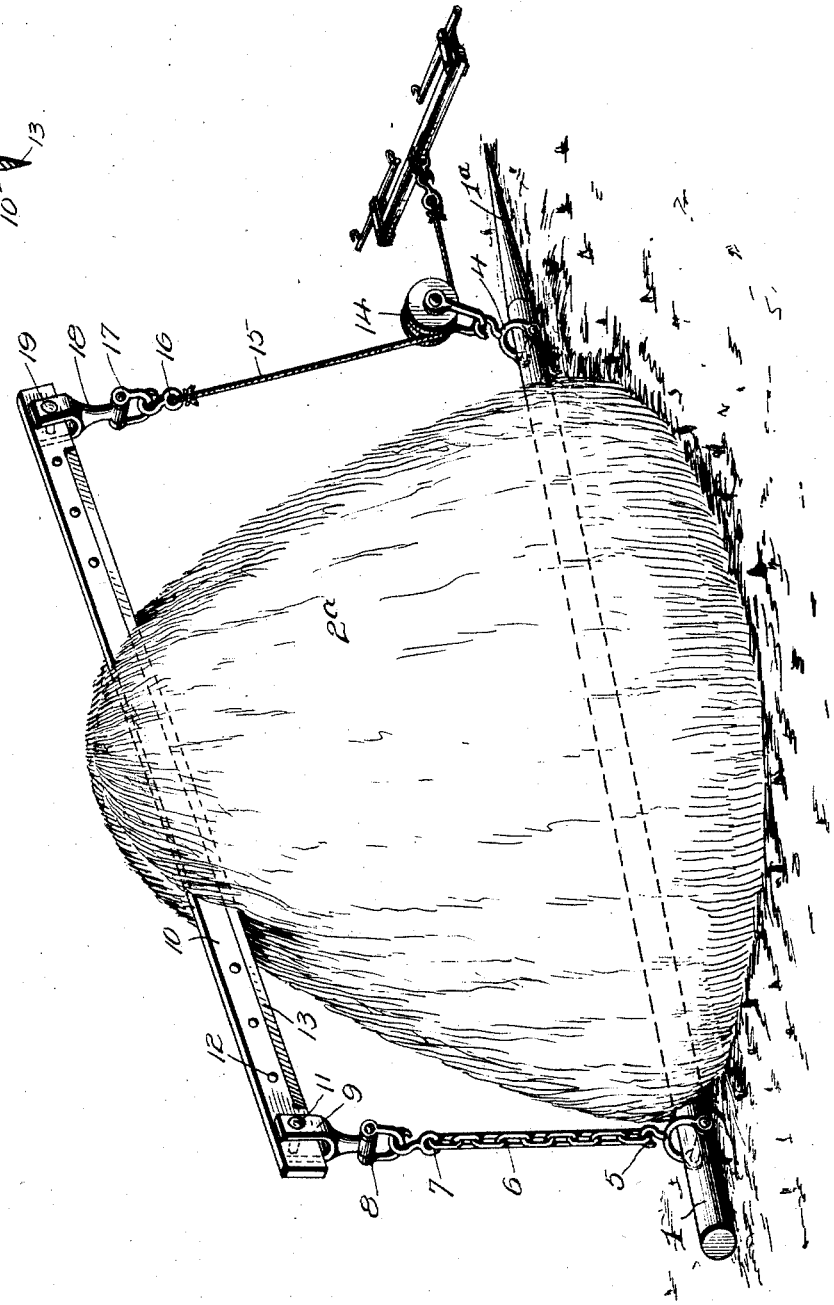

FRANK CABALKA, OF GEDDES, SOUTH DAKOTA.

POWER-ACTUATED HAY KNIFE.

1,415,789.

Specification of Letters Patent.   Patented May 9, 1922.

Application filed February 3, 1922. Serial No. 533,812.

*To all whom it may concern:*

Be it known that I, FRANK CABALKA, a citizen of the United States, residing at Geddes, in the county of Charles Mix and State of South Dakota, have invented certain new and useful Improvements in Power-Actuated Hay Knives, of which the following is a specification.

This invention has reference to power-actuated hay knives whereby a stack of hay or straw may be divided into two or more parts by power applied thereto by horses.

In accordance with the invention there is provided a bar or support upon which a stack of hay or straw is deposited, the bar being somewhat longer than the diameter of the stack.

In conjunction with the bar there is provided a cutting blade of suitable length with one long edge sharpened and one end of the blade is attached to a corresponding end of the bar by a chain or other flexible device of such length that when the blade and bar are approximately parallel and joined by a chain at one end of the bar and blade, a rope or cable is applied to the other end of the blade and passed about a pulley connected to the corresponding end of the bar and carried to a whiffle-tree for the application of horse power to cause the approach of the blade toward the bar to produce a cut through the stack and thus sever the stack into two pieces.

By connecting one end of the blade to the corresponding ends of the bar by chain and link connections with the blade interposed, and applying power to the other end of the blade and to the bar, the draft animals may be made to apply a shearing cut to the stack of hay or straw and sever the stack.

As the draft animals draw upon one end of the blade, the other end is held stationary by a flexible connection between said other end of the blade and the corresponding end of the bar, and this action may continue until the first named end of the blade has approached as close as may be to the corresponding end of the bar, after which the connection between the blade and the bar may be taken up, permitting the length of the cut through the stack to be increased as may be needed.

The invention will be best understood from a consideration of the following detailed description taken in connection with the accompanying drawing forming a part of the specification with the understanding that the invention is not confined to any strict conformity with the showing of the drawing, but may be changed and modified so long as such changes and modifications mark no material departure from the salient features of the invention as expressed in the appended claims.

In the drawings:—

Figure 1 is a perspective view of a stack of hay or straw with the knife structure associated therewith and arranged to be actuated by means of a team of horses.

Figure 2 is a cross section of the severing blade employed.

Referring to the drawings there is shown an elongated bar 1 of suitable size and strength and suitable material, say iron or steel, to withstand the stresses to which it may be subjected. This bar is made of suitable material and is somewhat longer than the width of a stack of hay or straw, and is pointed at one end 1ᵃ the stack being indicated at 2ᵃ.

The bar 1 is a round bar pointed at the end 1ᵃ, as stated, so that it may be driven through the base of the stack 2ᵃ by a sledge or maul.

Near each end of the bar 1 there is provided a hook 2, designed to receive and hold a swivel link 3, 4, respectively.

The link 3 has swivelled thereto a hook 5 to which is removably attached to one end of a chain 6, the other end of the chain terminating in a hook 7, shaped to be made fast in a clevis 8 pivoted in a link 9 carried by the corresponding end of a cutting blade 10. The link 9 is held to the blade by a pin 11 adapted to traverse any one of numerous holes 12 in the blade whereby the point of attachment of the link 9 to the blade may be varied at will.

One long edge 13 of the blade is sharpened and is so located as to be presented to the stack 2ᵃ to cause the severing of the stack in a manner to be described.

At the other end of the bar 1 there is mounted the hook 4 carrying a pulley 14 about which extends a rope 15 secured at one end to a link 16 made fast in a clevis 17 pivoted to a link 18 connected by a pin 19 to the corresponding end of the blade 10.

When a stack of hay or straw is located on the bar 1 and the knife 10 is also located on top of the stack with the chain 6 securing one end of the knife to the corresponding end of the bar 1 and the other end of the knife is made fast to the rope 15 and carried about the pulley 14, with a team of horses hitched to the corresponding end of the rope 15, and the horses are caused to draw on the rope 15, the whiffle-tree end of the rope is drawn toward the corresponding end of the bar 1, severing the hay or straw, the severing continuing until the blade has approached as near the bar 1 as may be, thereby tipping the blade corresponding.

In the mean time, the blade 10 at the end connected to the chain 6 has not further approached the bar 1, so that it becomes necessary to detach the chain 6 and the rope 15 thus making a new connection between the rope 15 and the blade 10 and between the chain 6 and the blade 10. This will result in bringing the blade 10 more nearly into parallelism with the bar 1 and correspondingly lowering the blade 10 to more nearly complete the severing of the stack of hay or straw.

In the following claims, the instrument is referred to as a hay knife without however restricting its use to such particular material.

What is claimed is:—

1. A hay knife, comprising an elongated bar or support adapted to underlie and traverse a stack of hay, an elongated knife of a length to extend over the stack for the full diameter of the latter and located over the bar lengthwise of the latter, flexible connections to each end of the bar knife, and power means connected with one end of said flexible connections and adapted to draw said knife longitudinally in the direction of the extension of said bar.

2. A hay knife comprising an elongated bar or support adapted to underlie and traverse a stack of hay, an elongated knife of a length to extend over the stack for the full diameter of the latter and located over the bar lengthwise thereof, flexible means for connecting the opposite ends of the knife to the corresponding ends of the bar, and power means adapted to be attached to one end of the knife to draw the latter transversely of the stack.

3. A hay knife comprising an elongated bar or support adapted to underlie and traverse a stack of hay, an elongated knife of a length to extend over the stack for the full diameter of the latter and located over the bar lengthwise thereof, a chain connecting the bar at one end to the corresponding end of the knife, and tackle for attaching power means to the other end of the knife and to the bar.

4. A hay knife for power actuation, comprising an elongated bar or support to underlie and traverse a stack of hay, an elongated knife of a length to extend over the stack for the full diameter of the latter and located over the bar lengthwise thereof, a chain and link connection therefrom into one end of the knife, and a link and tackle connection between the bar and the other end of the knife.

5. A hay cutting device comprising an elongated bar support adapted to underlie and traverse a stack of hay, an elongated knife of a length adapted to extend beyond the stack on opposite sides thereof and in the vertical plane of said bar, a flexible connection at one end between said bar and knife, a flexible means connected with the other end of the knife and movably connected with said bar, and means for operating said flexible means for operating said knife.

In testimony whereof, I affix my signature hereto.

FRANK CABALKA.